(12) United States Patent
Maki

(10) Patent No.: US 9,026,642 B2
(45) Date of Patent: May 5, 2015

(54) PROCESSING APPARATUS, CONTROL METHOD THEREOF, AND STORAGE MEDIUM

(75) Inventor: Nobuhiko Maki, Tokyo (JP)

(73) Assignee: Canon Kabushiki Kaisha (JP)

( * ) Notice: Subject to any disclaimer, the term of this patent is extended or adjusted under 35 U.S.C. 154(b) by 1019 days.

(21) Appl. No.: 12/716,899

(22) Filed: Mar. 3, 2010

(65) Prior Publication Data

US 2010/0235499 A1    Sep. 16, 2010

(30) Foreign Application Priority Data

Mar. 10, 2009    (JP) ................... 2009-056395

(51) Int. Cl.
| | |
|---|---|
| G06F 15/16 | (2006.01) |
| G06F 15/173 | (2006.01) |
| H04W 4/00 | (2009.01) |
| H04L 12/66 | (2006.01) |
| H04L 12/28 | (2006.01) |
| G06F 3/12 | (2006.01) |
| H04N 1/32 | (2006.01) |
| H04L 12/26 | (2006.01) |
| H04N 1/00 | (2006.01) |

(52) U.S. Cl.
CPC .......... *H04N 1/32122* (2013.01); *G06F 3/1208* (2013.01); *G06F 3/126* (2013.01); *G06F 3/1285* (2013.01); *G06F 3/1229* (2013.01); *G06F 3/1211* (2013.01); *H04L 43/028* (2013.01); *H04L 43/045* (2013.01); *H04N 1/00209* (2013.01); *H04N 1/00217* (2013.01); *H04N 1/00233* (2013.01); *H04N 2201/0094* (2013.01); *H04N 2201/3205* (2013.01); *H04N 2201/3214* (2013.01); *H04N 2201/3215* (2013.01); *H04N 2201/3219* (2013.01); *H04N 2201/3221* (2013.01); *H04N 2201/3273* (2013.01)

(58) Field of Classification Search
None
See application file for complete search history.

(56) References Cited

U.S. PATENT DOCUMENTS

| | | | | |
|---|---|---|---|---|
| 5,537,626 | A | * | 7/1996 | Kraslavsky et al. .............. 710/8 |
| 5,613,160 | A | * | 3/1997 | Kraslavsky et al. ............ 710/16 |
| 5,828,863 | A | * | 10/1998 | Barrett et al. ................... 703/24 |
| 6,781,721 | B2 | * | 8/2004 | Toyoda et al. ................ 358/402 |
| 2003/0103234 | A1 | * | 6/2003 | Takabayashi et al. ....... 358/1.15 |
| 2003/0142347 | A1 | * | 7/2003 | Christodoulou et al. .... 358/1.15 |
| 2003/0164988 | A1 | * | 9/2003 | Enomoto et al. ............. 358/400 |
| 2003/0182378 | A1 | * | 9/2003 | Treptow et al. ............... 709/206 |
| 2003/0212929 | A1 | * | 11/2003 | Sekizawa ........................ 714/47 |

(Continued)

FOREIGN PATENT DOCUMENTS

| | | |
|---|---|---|
| JP | 2004-362386 A | 12/2004 |
| JP | 2005-005820 A | 1/2005 |
| JP | 2005-051588 A | 2/2005 |

*Primary Examiner* — Ario Etienne
*Assistant Examiner* — Ho Shiu
(74) *Attorney, Agent, or Firm* — Rossi, Kimms & McDowell LLP

(57) ABSTRACT

A processing apparatus capable of making it easy to set a selection condition under which desired packets are acquired. When a desired print job log is selected from a displayed print job history or when a desired transmission job log is selected from a displayed transmission job history, a file creation unit automatically creates, based on address information in the selected print job log or in the selected transmission job log, a filtering condition expression for acquiring desired packets and sets the created expression to a filtering unit.

8 Claims, 13 Drawing Sheets

(56) References Cited

U.S. PATENT DOCUMENTS

| | | | |
|---|---|---|---|
| 2004/0109175 A1* | 6/2004 | Hatori et al. | 358/1.1 |
| 2004/0212834 A1* | 10/2004 | Edwards et al. | 358/1.18 |
| 2005/0052684 A1* | 3/2005 | Ferlitsch | 358/1.15 |
| 2005/0208926 A1* | 9/2005 | Hamada | 455/410 |
| 2005/0220099 A1* | 10/2005 | Igarashi | 370/389 |
| 2006/0047724 A1* | 3/2006 | Messing et al. | 707/204 |
| 2006/0064742 A1* | 3/2006 | Takahashi et al. | 726/4 |
| 2006/0087680 A1* | 4/2006 | Maeda | 358/1.15 |
| 2006/0114872 A1* | 6/2006 | Hamada | 370/338 |
| 2006/0155864 A1* | 7/2006 | Izumi | 709/230 |
| 2006/0274370 A1* | 12/2006 | Shima | 358/1.15 |
| 2007/0080776 A1* | 4/2007 | Suwabe et al. | 340/5.2 |
| 2007/0103715 A1* | 5/2007 | Nakata | 358/1.14 |
| 2007/0116054 A1* | 5/2007 | Hamaguchi | 370/475 |
| 2007/0153322 A1* | 7/2007 | Howard | 358/1.15 |
| 2007/0189266 A1* | 8/2007 | Izumi et al. | 370/352 |
| 2007/0201091 A1* | 8/2007 | Tanaka | 358/1.16 |
| 2007/0266237 A1* | 11/2007 | Kuroki | 713/156 |
| 2007/0272741 A1* | 11/2007 | Hirano | 235/380 |
| 2007/0273924 A1* | 11/2007 | Ozawa | 358/1.15 |
| 2007/0279670 A1* | 12/2007 | Hiruma | 358/1.14 |
| 2007/0291284 A1* | 12/2007 | Kittaka et al. | 358/1.1 |
| 2007/0299970 A1* | 12/2007 | Huang et al. | 709/225 |
| 2008/0030769 A1* | 2/2008 | Hanaoka et al. | 358/1.15 |
| 2008/0074698 A1* | 3/2008 | Richter et al. | 358/1.15 |
| 2008/0117449 A1* | 5/2008 | Lauridsen et al. | 358/1.15 |
| 2008/0117452 A1* | 5/2008 | Murakami | 358/1.15 |
| 2008/0130044 A1* | 6/2008 | Yamada | 358/1.15 |
| 2008/0147776 A1* | 6/2008 | Inoue | 709/202 |
| 2008/0159770 A1* | 7/2008 | Ohmura et al. | 399/82 |
| 2008/0317031 A1* | 12/2008 | Inoue | 370/392 |
| 2009/0009794 A1* | 1/2009 | Morikawa et al. | 358/1.15 |
| 2009/0009803 A1* | 1/2009 | Takeuchi et al. | 358/1.15 |
| 2009/0051958 A1* | 2/2009 | Ito | 358/1.14 |
| 2009/0147299 A1* | 6/2009 | Tetu | 358/1.15 |
| 2009/0222403 A1* | 9/2009 | Kato | 707/1 |
| 2009/0268228 A1* | 10/2009 | Lankreijer et al. | 358/1.14 |

* cited by examiner

FIG.6

| | |
|---|---|
| ACCEPTANCE NUMBER | ~ 601 |
| DATE AND TIME | ~ 602 |
| DEPARTMENT ID | ~ 603 |
| DESTINATION | ~ 604 |
| RESULT | ~ 605 |
| REMOTE ADDRESS | ~ 606 |
| REMOTE PORT | ~ 607 |
| LOCAL ADDRESS | ~ 608 |
| LOCAL PORT | ~ 609 |

TRANSMISSION JOB HISTORY — 1100

1101

| ACCEPTANCE NUMBER | DATE AND TIME | DEPARTMENT ID | DESTINATION | RESULT |
|---|---|---|---|---|
| 0009 | 01/02 03:10 | 0000009 | VMAX | NG |
| 0010 | 01/06 04:05 | 0000010 | VMAX2 | NG |
| 0011 | 01/10 03:10 | 0000011 | VMAX3 | NG |
| 0012 | 01/17 03:10 | 0000012 | VMAX9 | NG |
| 0013 | 01/13 04:05 | 0000013 | LOCAL | NG |
| 0014 | 01/21 04:05 | 0000014 | VMAX10 | NG |
| 0015 | 01/25 03:10 | 0000015 | VMAX3 | NG |

◀ 1/2 ▶

DETAILED INFORMATION ▲

AUTOMATIC FILTER CREATION — 1102

CLOSE

PROCESSING APPARATUS, CONTROL METHOD THEREOF, AND STORAGE MEDIUM

BACKGROUND OF THE INVENTION

1. Field of the Invention

The present invention relates to a technique for handling a communication failure in a processing apparatus that has a network communication function and is configured to perform information processing.

2. Description of the Related Art

Conventionally, there has been known a technique to acquire, when a failure has occurred in network communication equipment, packets flowing through a network communication path and investigate the cause of the failure. General investigation technique is to connect equipment dedicated for packet acquisition to a line concentrator (e.g., a hub) and acquire packets flowing through a LAN (local area network) by using the acquisition equipment.

With this technique, contents of packet data transmitted from and received by the network communication equipment under investigation are analyzed based on acquired packets, and a location where data not complying with specified requirements has been received or a location where a delay has occurred in responding to packet reception is identified. To confirm whether the identified location is the cause (source) of the failure, investigation is performed by, e.g., transmitting the same packet to the network communication equipment to see if the failure is reproduced or by analyzing a source code used in communication by the network communication equipment.

To ensure a storage region for the packet acquisition equipment or reduce the labor of the packet analysis for the investigation, there is a packet filtering function. With this function, only packets matching a particular condition are acquired, whereby the number of packets to be acquired can be reduced. As a result, it is possible to reduce a memory region for recording the acquired packets and reduce a hard disk region for long term storage.

It is also possible to reduce man-hour required for the analysis.

In most cases, filtering rules are specified by network protocol elements. For example, only a particular protocol, e.g., IP (Internet protocol) or ARP (address resolution protocol), is filtered so as to acquire packets only according to the particular protocol. More detailed filtering can be performed for every protocol. For example, for the IP protocol, detailed filtering can be made by setting conditions such as particular transmission destination address, particular transmission destination port number, particular transmission source address, and particular transmission source port number.

Recently, network communication equipment having a packet acquiring function has been in widespread use. With this function, packets can be acquired without using equipment specialized for packet acquisition. It is therefore possible to acquire packets even in a network to which a switching hub is connected. In addition, it has recently been possible to perform filtering specialized for the intended purpose or functionality of network communication equipment. Unlike the filtering specified by network protocol elements, the filtering specialized for the function of network communication equipment is able to further improve the efficiency of failure analysis.

For example, a network printer disclosed in Japanese Laid-open Patent Publication No. 2004-362386 is capable of storing packet data in units of received print jobs and capable of performing failure analysis in units of print jobs. As a result, during printing of print jobs received via a network, only a print job where a failure has occurred can be extracted to analyze the failure, whereby the efficiency of analysis can be improved.

As a conventional packet filtering method, Japanese Laid-open Patent Publication No. 2005-51588 proposes a filtering method where IP packets unnecessary for a network terminal are automatically recognized and discarded.

However, in order to input and set a packet filtering condition for execution of the conventional technique to an image forming apparatus, it takes much labor and time for key manipulation to input the filtering condition since keys provided on an operation unit of the image forming apparatus are extremely fewer in number than keys provided on, e.g., an operation unit of a personal computer.

More specifically, since the filtering condition to be input for, e.g., the IP protocol includes particular transmission destination address, particular transmission destination port number, particular transmission source address, particular transmission source port number, etc., it takes much time and labor to input the filtering condition via the operation unit of the image forming apparatus.

In a case where the filtering condition is manually input to the image forming apparatus, there is a fear that the filtering condition is erroneously set by an input mistake, resulting in inability to acquire intended packets.

In a case where the filtering condition is set to the image forming apparatus by uploading a file in which the filtering condition is written from, e.g., a personal computer to the image forming apparatus, preparatory work such as creating the upload file, registering the upload file into the personal computer, and connecting the personal computer to a network must be made, resulting in much expense in time and effort.

SUMMARY OF THE INVENTION

The present invention provides a processing apparatus capable of easily setting a selection condition under which desired packets are acquired, a control method of the processing apparatus, and a storage medium storing a program for causing a computer to execute the control method.

According to a first aspect of this invention, there is provided a processing apparatus, which comprises a communication unit configured to perform communication via a network, a packet acquisition unit configured to acquire packets flowing through the network, a holding unit configured to hold pieces of communication record information relating to communications performed by the communication unit via the network, a display unit configured to display the pieces of communication record information held by the holding unit, and a creation unit configured to create, based on communication record information selected from among the pieces of communication record information displayed by the display unit, a selection condition under which packets to be acquired by the packet acquisition unit are selected.

According to a second aspect of this invention, there is provided a control method of a processing apparatus, which comprises a communication step of performing communication via a network, a packet acquisition step of acquiring packets flowing through the network, a holding step of holding pieces of communication record information relating to communications performed via the network in the communication step, a display step of displaying the pieces of communication record information held in the holding step, and a creation step of creating, based on communication record information selected from among the pieces of communication record information displayed in the display step, a selection condition under which packets to be acquired in the packet acquisition step are selected.

According to a third aspect of this invention, there is provided a computer-readable storage medium storing a program for causing a computer to execute the control method according to the second aspect of this invention.

With this invention, a selection condition under which packets to be acquired by the packet acquisition unit are selected is automatically created by the creation unit by only selecting desired communication record information from among pieces of communication record information displayed by the display unit.

With this invention, therefore, the selection condition under which desired packets are acquired can easily be set and user-friendliness can be improved.

Further features of the present invention will become apparent from the following description of exemplary embodiments with reference to the attached drawings.

BRIEF DESCRIPTION OF THE DRAWINGS

FIG. 6 is a view showing information items in a transmission job log;

FIG. 10 is a view showing a transmission job history screen;

DETAILED DESCRIPTION OF THE PREFERRED EMBODIMENTS

The present invention will now be described in detail below with reference to the drawings showing preferred embodiments thereof.

In the below-described embodiments, the technical concept of this invention is applied to an image forming apparatus, e.g., a multifunction peripheral (hereinafter referred to as MFP).

First Embodiment

Figure 1:
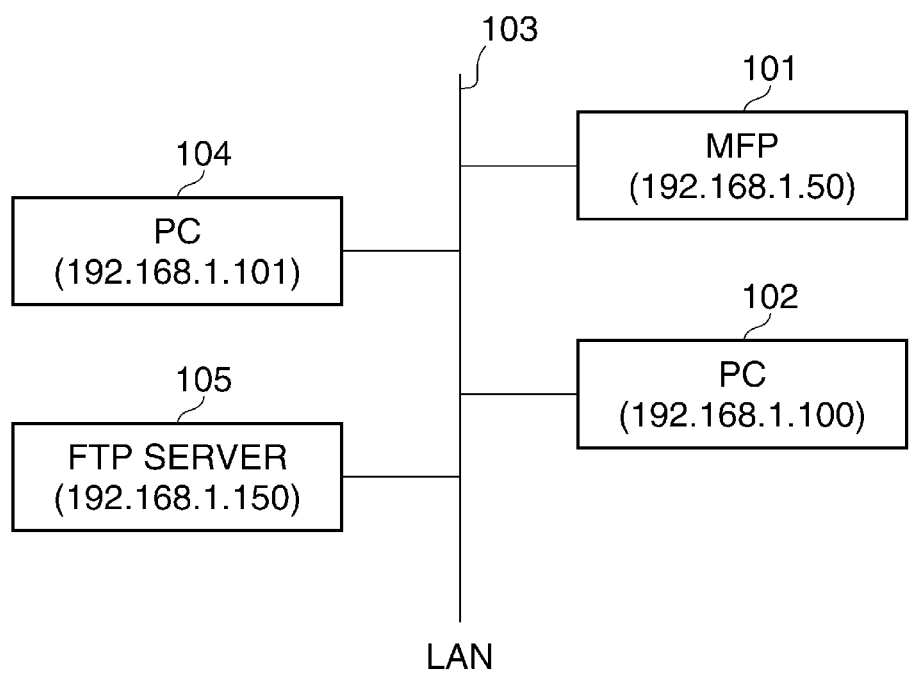
FIG. 1 is a view showing an environment of a network to which an image forming apparatus (MFP) according to first to third embodiments of this invention is connected.

FIG. 1 shows an environment of a network to which an image forming apparatus according to first to third embodiments of this invention is connected.

The image forming apparatus (MFP) 101 is connected to an LAN 103 implemented by a bus-structured Ethernet (registered trademark). An FTP server 105 and a number of personal computers including PCs 102, 104 are also connected to the LAN 103.

It is assumed that the MFP 101 is assigned with an IP address of 192.168.1.50, the PCs 102, 104 are respectively assigned with IP addresses of 192.168.1.100 and 192.168.1.101, and the FTP server 105 is assigned with an IP address of 192.168.1.150.

The MFP 101 has a construction described in detail later with reference to FIG. 2. The PCs 102, 104 each have a CPU (central processing unit), a RAM, a HDD (hard disk drive), a CD-ROM drive, a NIC (network interface card), a USB host interface, etc., which are not shown but are connected via a bus with one another. Input and output peripherals such as a mouse, a CRT display, and a keyboard are connected to respective ones of the PCs 102, 104.

The PCs 102, 104 are each installed with software including an OS (operating software), a word-processing software, a spread sheet software, etc. The OS includes, as its function, a port monitor for use in transmitting print data to a printer or to the MFP via a network. Each of the PCs 102, 104 is also installed with FTP client software for use in transmitting and receiving an electronic file to and from the FTP server 105.

The FTP server 105 is responsible for transmitting and receiving an electronic file by using an FTP (file transfer protocol). FTP accounts for respective nodes connected to the LAN 103 (e.g., the MFP 101 and the PCs 102, 104) are set in the FTP server 105. With the FTP account settings, each node is able to transmit an electronic file via the FTP server 105.

Figure 2:
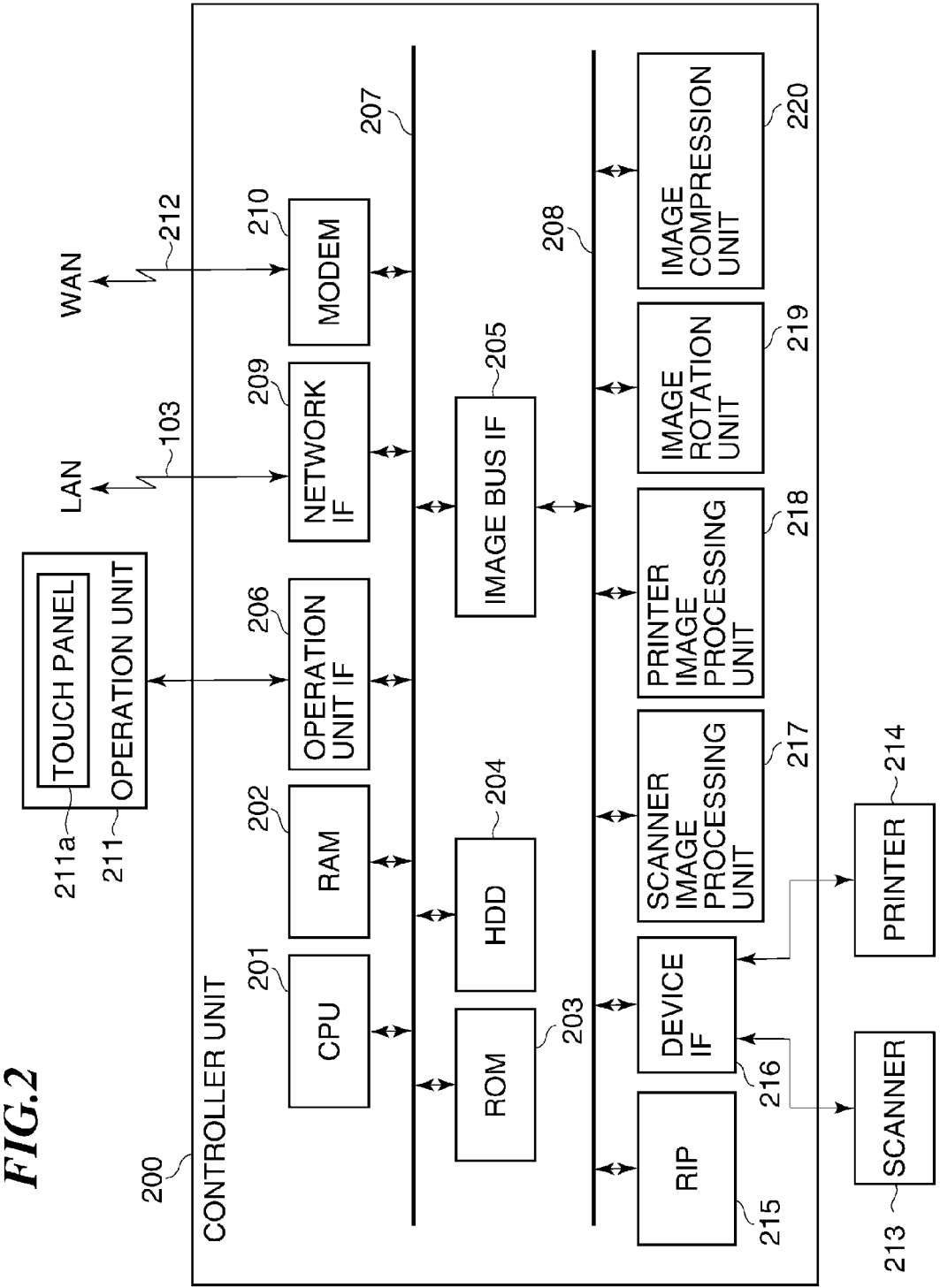
FIG. 2 is a block diagram showing the construction of a control system of the MFP shown in FIG. 1.

FIG. 2 schematically shows in block diagram the construction of a control system of the MFP 101. A scanner 213 as an image input device and a printer 214 as an image output device are connected to a controller unit 200. The controller unit 200 performs control for realizing a copy function to read image data by the scanner 213 and print out the read image data by the printer 214. The controller unit 200 controls input and output of image information and device information between itself and the PCs 102, 104 via the LAN 103 and the FTP server 105, and controls data communication between itself and apparatuses on a WAN 212.

The controller unit 200 includes a CPU 201 that starts the operating system (OS) by using a boot program stored in a ROM 203, and executes, on the OS, an application program stored in an HDD 204 to thereby carry out various processing. The CPU 201 uses a RAM 202 as a work area. The RAM 202 provides the work area and an image memory area in which image data is temporarily stored.

Figure 3:
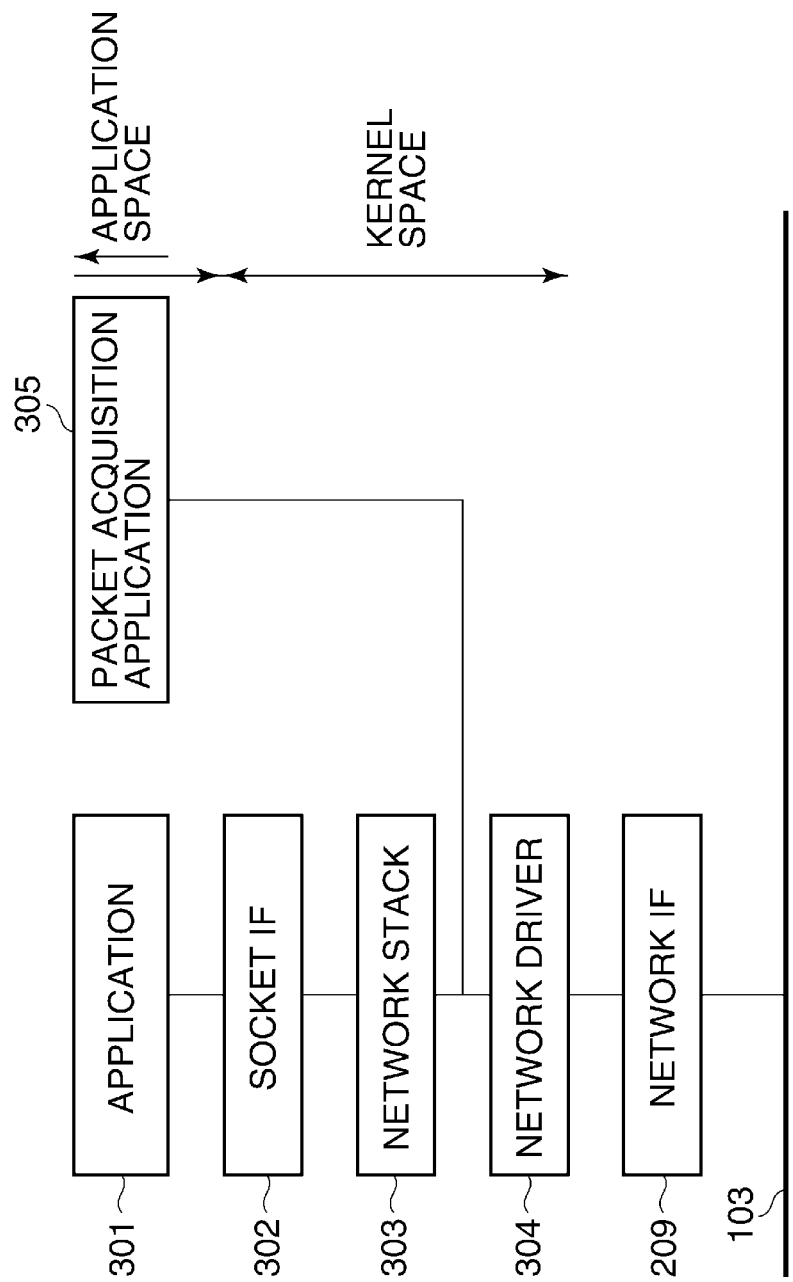
FIG. 3 is a view showing a group of packet acquisition software.

The HDD 204 stores the application program and image data, and also stores a group of software proper to this embodiment and shown in FIG. 3.

Figure 7:
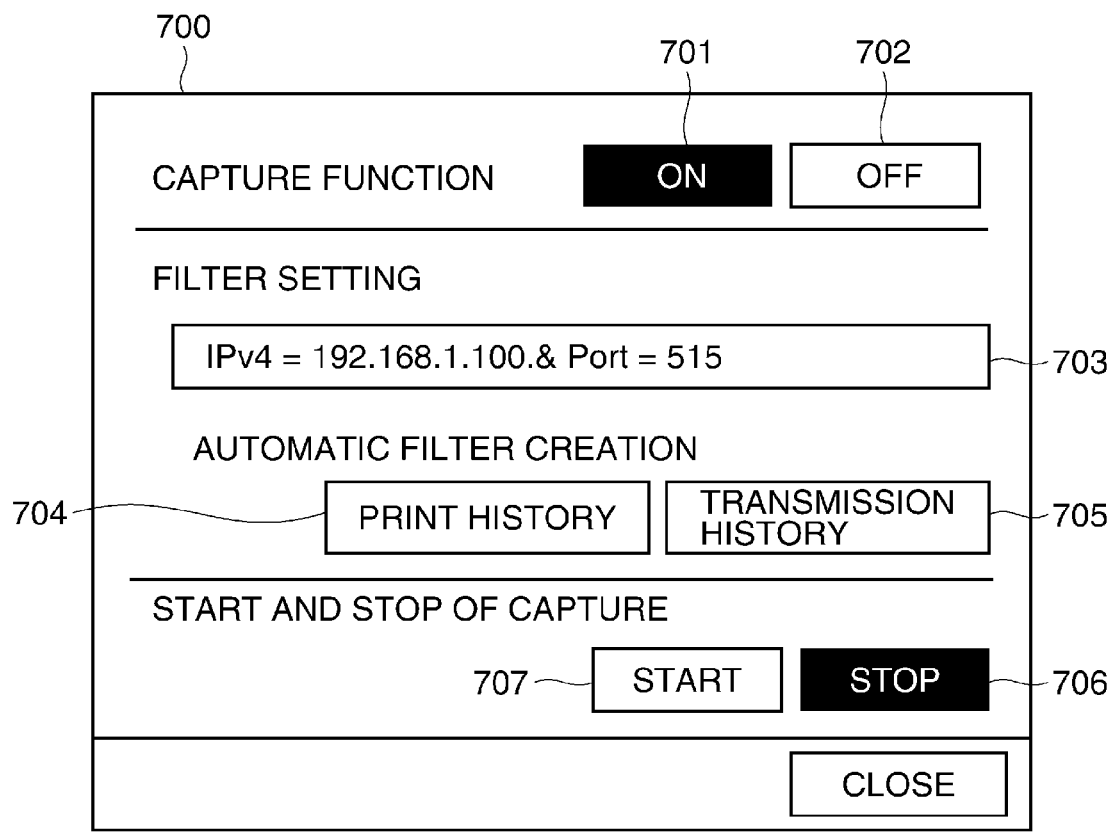
FIG. 7 is a view showing an operation screen displayed by the packet acquisition application.
Figure 8:
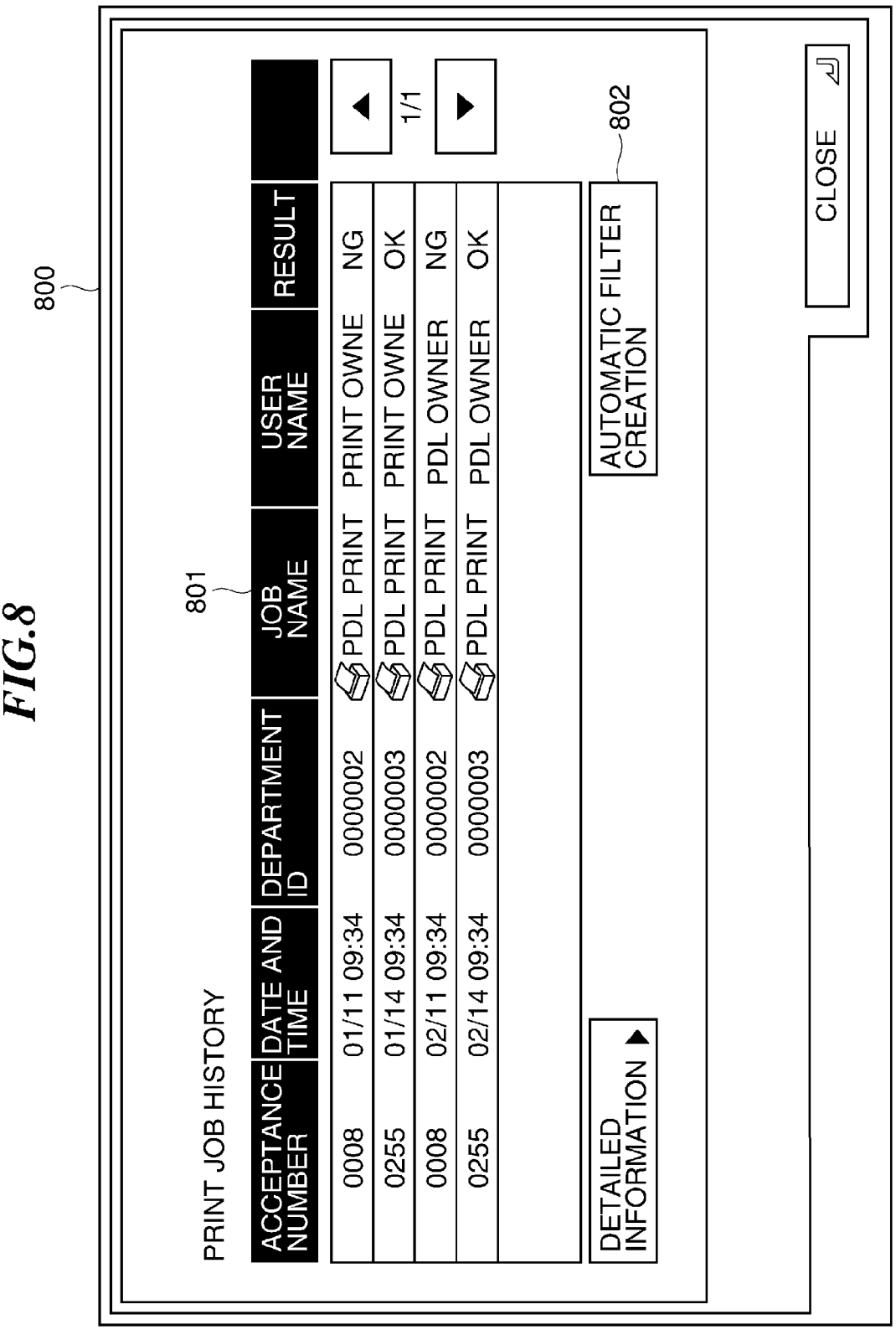
FIG. 8 is a view showing a print job history screen.

An operation unit IF (interface) 206, a network IF 209, a modem 210, an image bus IF 205, etc. are connected to the CPU 201 via a system bus 207. The operation unit IF 206 is an interface with an operation unit 211 having a touch panel 211a, and outputs to the operation unit 211 image data to be displayed thereon. The operation unit IF 206 outputs an operation signal of the operation unit 211 to the CPU 201. A UI (user interface) screen, described later with reference to FIGS. 7, 8 and 10, is displayed on the touch panel 211a.

The network IF 209 is connected to the LAN 103 and performs input and output of information between itself and apparatuses on the LAN 103. The modem 210 is connected to the WAN 212 and performs input and output of information. The image bus IF 205 connects the system bus 207 with an image bus 208 for transfer of image data at high speed, and functions as a bus bridge for converting data structure.

The image bus 208 is implemented by a PCI bus or an IEEE 1394 bus. Connected to the image bus 208 are a RIP 215, a device IF 216, a scanner image processing unit 217, a printer image processing unit 218, an image rotation unit 219, and an image compression unit 220.

The RIP 215 is a processor that decompresses PDL codes into bitmap image data. The device IF 216 to which the scanner 213 and the printer 214 are connected performs synchronous/asynchronous conversion of image data. The scanner image processing unit 217 performs correction, modification, and editing on input image data. The printer image processing unit 218 performs printer correction, resolution conversion, or the like on print-output image data. The image rotation unit 219 carries out rotation of image data. The image compression unit 220 carries out compression of multi-valued image data into JPEG data, compression of binary image data into JBIG, MMR, MH or other data, and decompression thereof.

FIG. 3 is view showing a group of packet acquisition software proper to this embodiment. The software group is stored in the HDD 204, is developed on the RAM 202, and is executed by the CPU 201.

An application 301 is a group of network applications running on the MFP 101. A socket IF 302 is a socket IF program provided by the OS. To perform communication by using a network application contained in the application 301, the socket IF 302 is called to enable data transmission and reception.

Although the socket IF 302 is not an indispensable program for the network application to perform communication, the socket IF 302 makes it possible to use a general purpose program instruction and a process flow irrespective of the type of OS and hence to reduce man-hour of development of application. Accordingly, the network application usually calls the socket IF 302 to perform data transmission and reception. A network stack 303 is a group of protocol stacks. A network driver 304 is a device driver of the network IF 209.

A packet acquisition application 305 acquires network packets transmitted and received via the network IF 209 (hereinafter referred to as the packets), and outputs a print job log and a transmission job log, which are described later, to the touch panel 211a. The packet acquisition application 305 acquires all the packets transmitted from and received by the network IF 209 via the network driver 304.

The application 301 and the packet acquisition application 305 operate in application space. The socket IF 302, the network stack 303, and the network driver 304 operate in kernel space of the OS.

Figure 4:
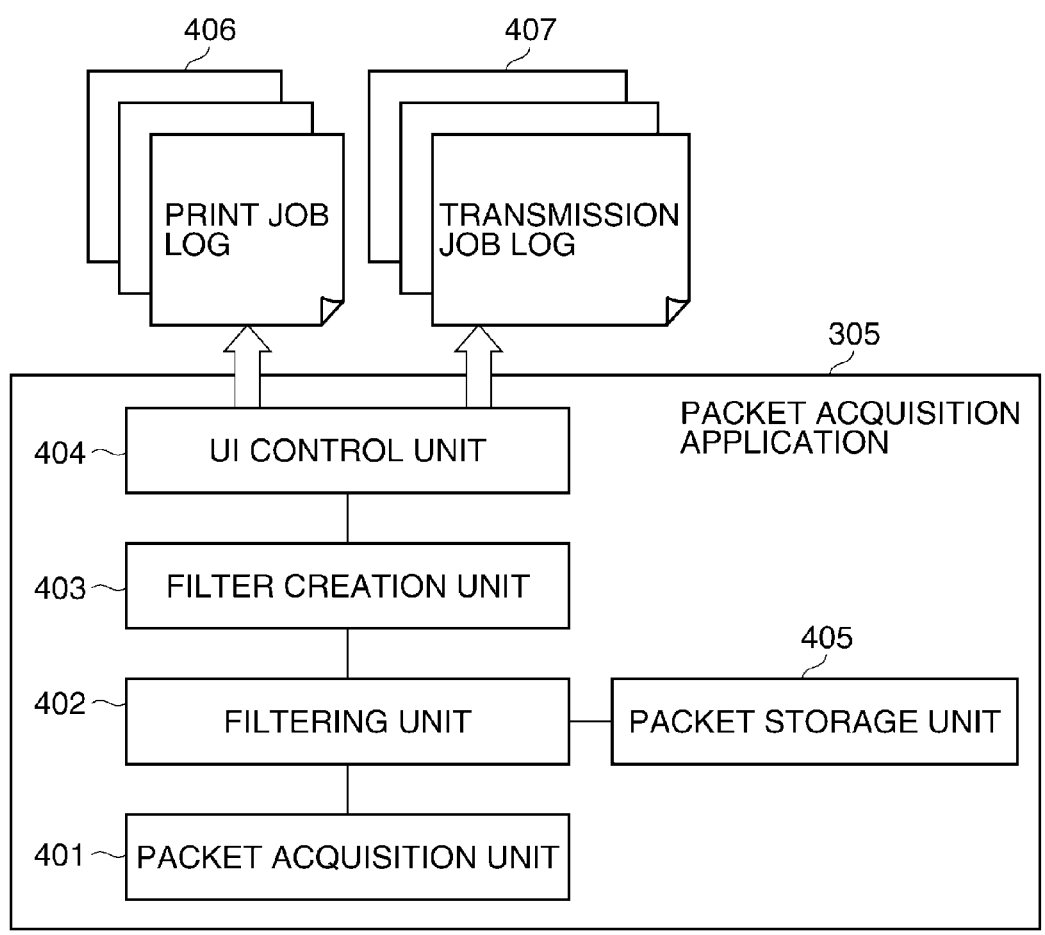
FIG. 4 is view showing a primary construction of a packet acquisition application.

FIG. 4 shows the primary construction of the packet acquisition application 305. A packet acquisition unit 401 acquires from the network driver 304 all the packets transmitted from and received by the MFP 101 via the network IF 209. A filtering unit 402 filters the packets acquired by the packet acquisition unit 401 in accordance with a predetermined filtering condition, and delivers packets matching the filtering condition to a packet storage unit 405.

The packet storage unit 405 stores the packets delivered from the filtering unit 402 into the HDD 204. A file creation unit 403 creates a packet filtering condition in accordance with an instruction from a UI control unit 404, and sets the packet filtering condition to the filtering unit 402.

The UI control unit 404 controls the operation unit I/F 206 and displays an operation screen (UI screen) for the packet acquisition application 305 on the touch panel 211a of the operation unit 211. The UI control unit 404 controls the entire packet acquisition application 305 in accordance with touch signals from the touch panel 211a on which the UI screen is displayed. The touch signals include instruction signals such as a network packet acquisition start instruction, a network packet acquisition stop instruction, an automatic filter creation instruction, and a filter setting instruction.

When receiving the automatic filter creation instruction, the UI control unit 404 displays a job log list (job history) on the touch panel 211a by referring to print job logs 406 and transmission job logs 407, i.e., communication record information.

Each of the print job logs 406 is log information of a corresponding print job, and each of the transmission job log 407 is log information of a corresponding transmission job. The print job logs and the transmission job logs are held in the HDD 204.

Figure 5:
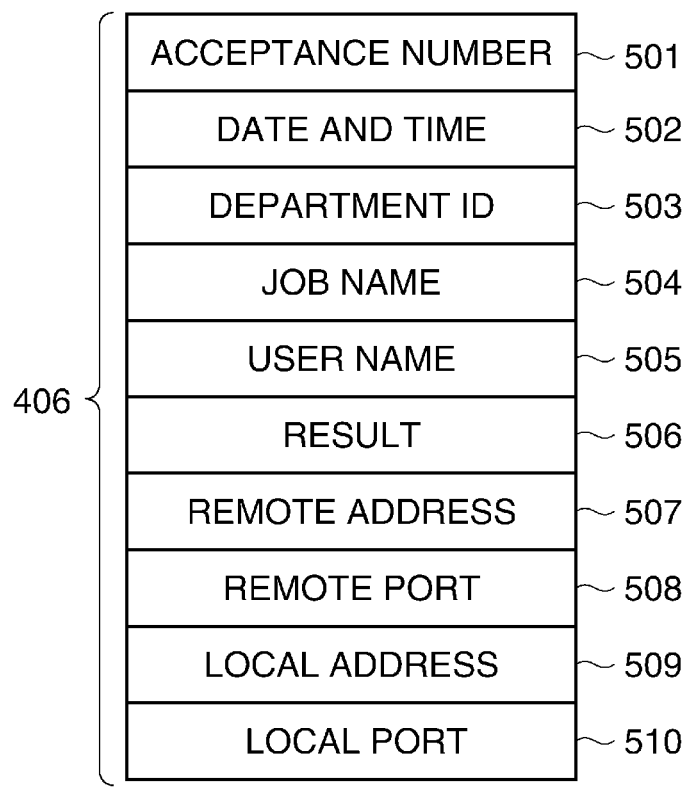
FIG. 5 is a view showing information items in a print job log.

FIG. 5 shows information items in the print job log 406. An acceptance number 501 is a number uniquely assigned to each of print jobs. It should be noted that the term "print job" used herein only indicates a print job that is input by remote operation, and hence does not include a print job input from the operation unit of the image forming apparatus 101.

A date and time 502 is information that represents the date and time where a corresponding print job is accepted. A department ID 503 is a department code (identifier) assigned to the print job, a job name 504 is a name assigned to the print job, a user name 505 is a name of a user inputting the print job, and a result 506 is information representing a result of execution of the print job.

A remote address 507 is an IP address that is used by print job input source equipment (communication counterpart equipment) to input the print job by remote operation. A remote port 508 is a port number that is used by the print job input source equipment to input the print job by remote operation.

A local address 509 is an IP address that is used by the MFP 101 to receive the print job, and a local port 510 is a port number used by the MFP 101 to receive the print job.

In this embodiment, pieces of information indicated in the items 501 to 510 are held as one print job log 406 in the HDD 204. It should be noted that the print job log 406 is created each time a corresponding print job has been processed by the MFP 101. In the HDD 204, a plurality of print job logs (communication record information) can be held.

FIG. 6 shows information items in the transmission job log 407. An acceptance number 601 is a number uniquely assigned to each of transmission jobs. A date and time 602 is information that represents the date and time where a corresponding transmission job is accepted. A department ID 603 is a department code (identifier) assigned to the transmission job, a destination 604 is information representing a destination of the transmission job (such as a host name of communication counterpart), and a result 605 is information representing a result of transmission of packets relating to the transmission job (these packets will be referred to as the transmission job-related packets).

A remote address 606 is an IP address of communication counterpart equipment to which transmission job-related packets are transmitted. A remote port 607 is a port number of the communication counterpart equipment. A local address 608 is an own IP address information used by the MFP 101 for transmission of transmission job-related packets. A local port 609 is a port number of an own port used by the MFP 101 for transmission of transmission job-related packets.

In this embodiment, the information items 601 to 609 are held as one transmission job log in the HDD 204. It should be noted that the transmission job log is created each time a corresponding transmission job has been processed by the MFP 101. In the HDD 204, a plurality of transmission job logs (communication record information) can be held.

FIG. 7 shows a packet acquisition operation screen (UI screen) 700, which is displayed on the touch panel 211a of the operation unit 211 by the packet acquisition application 305. On the operation screen 700, an ON button 701 for setting a packet capture function to be ON and an OFF button 702 for setting the capture function to be OFF are displayed.

In a filter setting box 703, a filtering condition expression set by an operator (i.e., a selection condition under which desired packets are selected) is echo displayed. Specifically, a software keyboard is displayed when the operator touches the filter setting box 703, and a filtering condition expression (selection condition) input by using the software keyboard is echo displayed in the filter setting box 703.

A print history button 704 and a transmission history button 705 are used for displaying a print job history screen and a transmission job history screen, respectively, on each of which information for automatic creation of filtering condition expression is displayed. A start button 707 and a stop button 706 are used for instructing start and stop of packet acquisition, respectively.

FIG. 8 shows a print job history screen, which is displayed on the touch panel 211a when the print history button 704 in FIG. 7 is touched. It should be noted that only history information on print jobs input by remote operation is displayed on the print job history screen 800 in FIG. 8, and hence history information on print jobs input by a manipulation on the operation unit 211 of the MFP 101 is not displayed on the screen 800.

On the print job history screen 800, information on the print job logs held in the HDD 204 is displayed in a list, as print job history information 801. If the information on all the print job logs cannot be displayed on the screen 800 at a time, the list is scrolled by using scroll buttons. Information items in each of the print job logs include acceptance number, date and time, department ID, job name, user name, and result, which correspond to a part of the information items in the print job log shown in FIG. 5.

When a desired one of the print job logs displayed as the print job history information 801 is touched and then an automatic filter creation button 802 is touched, a filtering condition expression is automatically created based on the touched print job log, as will be described later.

Figure 9:
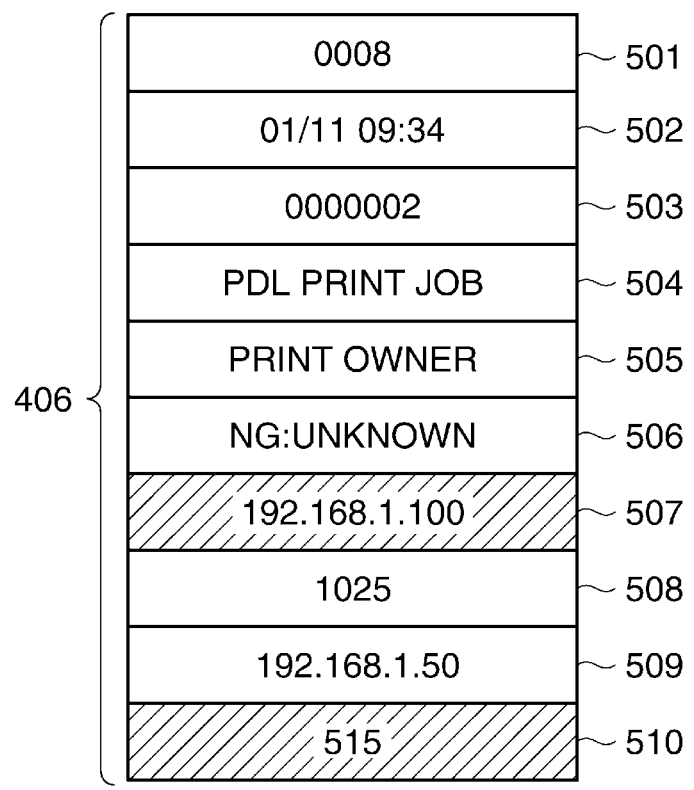
FIG. 9 is a view showing an example of information in the print job log.

FIG. 9 shows an example of print job log 406. In FIG. 9, there is shown a print job log 406 that is held by the MFP 101 when a network print request is issued from the PC 102 to the MFP 101.

In the print job log 406 in FIG. 9, the acceptance number 501 is 0008, the date and time 502 is 01/11 09:34, the department ID 503 is 0000002, the job name 504 is PDL Printer Job, the user name 505 is Print Owner, and the result 506 is "NG: Unknown." The result "NG: Unknown" indicates that the print job has abnormally been completed and the cause of abnormal completion is unknown.

The remote address 507 is 192.168.1.100, which indicates that the print job has been input from equipment having an IPv4 address of 192.168.1.100.

The remote port 508 is 1025, which indicates that the print job has been transmitted from port 1025 on remote equipment. The local address 509 is 192.168.1.50. This information indicates that the MFP 101 has an IPv4 address of 192.168.1.50 and the print job has been received at that address. The local port 510 is 515, which indicates that the MFP 101 has received the print job at a port having that port number.

Based on the information in the print job log shown in FIG. 9, the file creation unit 403 automatically creates the following filtering condition expression (1).

$$\text{IPv4}=192.168.1.100 \text{ AND Port}=515 \qquad (1)$$

The filtering condition expression (1) is created from information of the remote address 507 and information of the local port 510 shown in FIG. 9. Specifically, the filtering condition expression (1) is a filtering condition expression for acquiring only packets each including information representing the IPv4 address of 192.168.1.100 and the port number of 515. In other words, the filtering condition expression (1) indicates that only packets, which have been used to transfer print data from the PC 102 to the MFP 101 by using an LPD protocol (LPD uses port 515), must be acquired.

FIG. 10 shows a transmission job history screen, which is displayed on the touch panel 211a when the transmission history button 705 in FIG. 7 is touched. On the transmission job history screen 1100, transmission job history information 1101 is displayed. Items of the transmission job history information 1101 include acceptance number, date and time, department ID, destination, and result, which correspond to a part of the information items in the transmission job log shown in FIG. 6 and which are displayed in a list.

When a desired one of the transmission job logs displayed as the transmission job history information 1101 is touched and then an automatic filter creation button 1102 is touched, a filtering condition expression is automatically generated based on the touched transmission job log, as will be described later.

Figure 11:
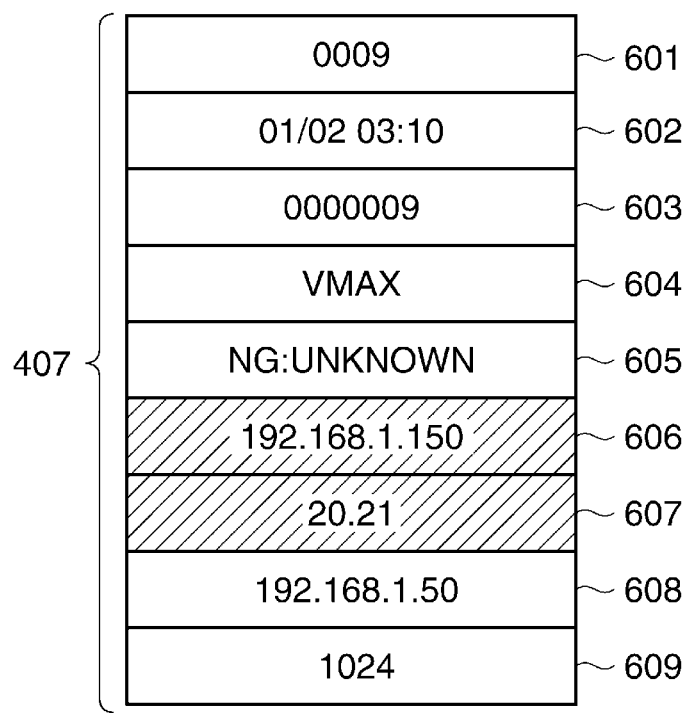
FIG. 11 is a view showing an example of information in the transmission job log.

FIG. 11 shows an example of transmission job log 407. In FIG. 11, there is shown a transmission job log 407 that is held by the MFP 101 when network file transmission is performed from the PC 102 to the MFP 101.

In the transmission job log 407 in FIG. 11, the acceptance number 601 is 0009, the date and time 602 is 01/02 03:10, the department ID 603 is 0000009, the destination 604 is vmax, and the result 605 is "NG: Unknown." The result "NG: Unknown" indicates that the network file transmission has abnormally be completed and the cause of abnormal completion is unknown.

The remote address 606 is 192.168.1.150. This information indicates that a transmission destination of the transmission job is equipment having an IPv4 address of 192.168.1.150. The remote port 607 is "20, 21". This information indicates that the transmission job-related packets has been transmitted to ports 20, 21 on remote equipment.

The local address 608 is 192.168.1.50. This information indicates that the MFP 101 has an IPv4 address of 192.168.1.50 and transmission job-related packets have been transmitted from that address. The local port 609 is 1024. This information indicates that the MFP 101 has transmitted transmission job-related packets from a port having that port number.

Based on the information in the print job log shown in FIG. 11, the file creation unit 403 automatically creates the following filtering condition expression (2).

$$\text{IPv4}=192.168.1.150 \text{ AND (Port}=21 \text{ or Port}=20) \qquad (2)$$

The filtering condition expression (2) is created from information of the remote address 606 and information of the remote port 607 shown in FIG. 11. Specifically, the filtering condition expression (2) is a filtering condition expression for acquiring only packets each including information representing the IPv4 address of 192.168.1.150 and the port number of 21 or 20. In other words, the filtering condition expression (2) indicates that only packets, which have been used to transfer file data from the MFP 101 to the FTP server 105 by using an FTP protocol (FTP uses ports 20 and 21), must be acquired.

Figure 12:
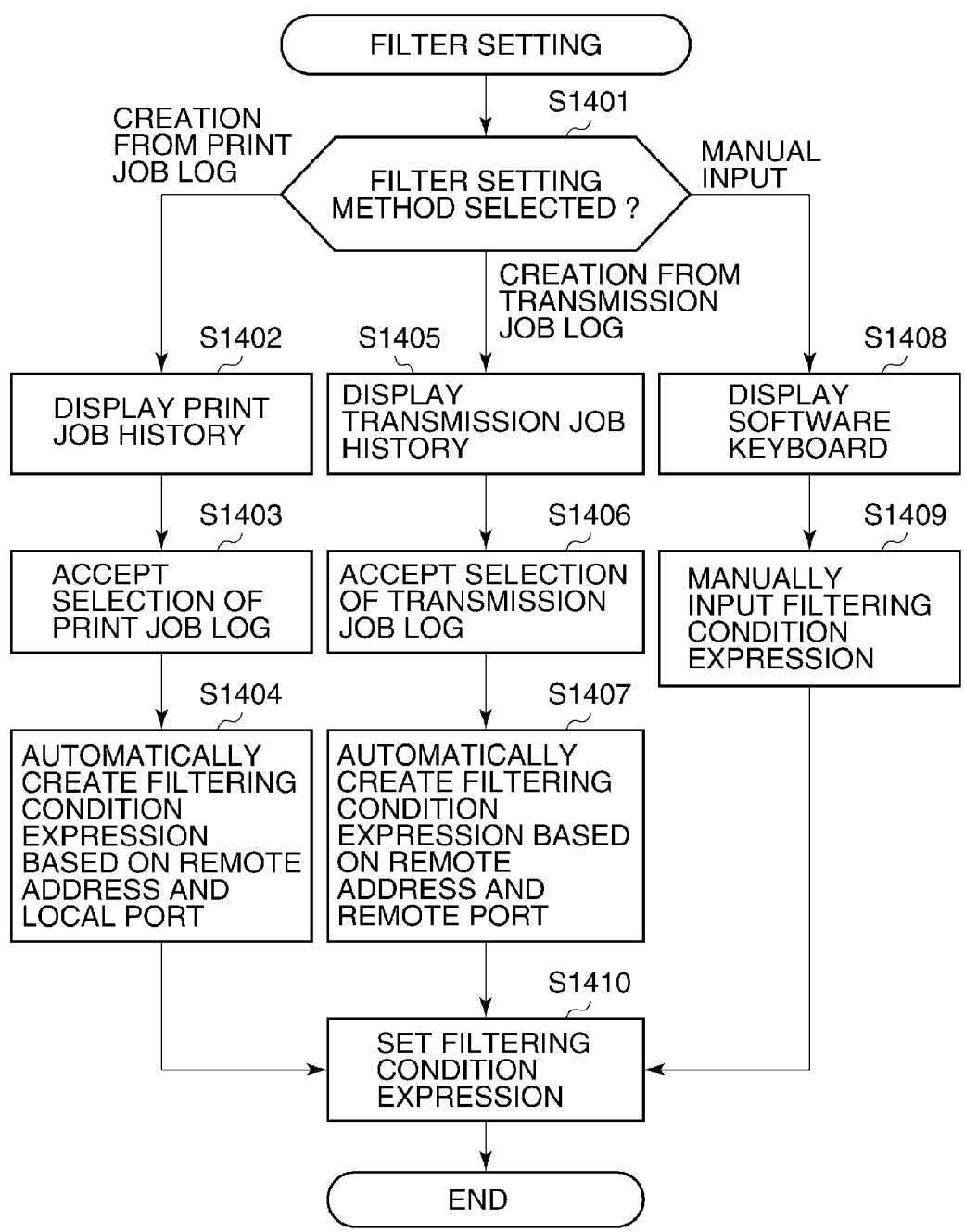
FIG. 12 is a flowchart showing a process for setting a filtering condition expression according to the first embodiment.

Next, a process for setting the filtering condition expression will be described with reference to FIG. 12.

The setting process is executed under the control of the UI control unit 404 of the packet acquisition application 305.

When the ON button 701 on the packet acquisition operation screen 700 shown in FIG. 7 is set ON, the UI control unit 404 determines which of the print history button 704, the transmission history button 705, and the filter setting box 703 is touched, i.e., determines which of filtering condition setting methods is selected (S1401).

When the print history button 704 is touched, i.e., when a method for creation from print job log is selected, the UI control unit 404 displays a list of the print job logs held in the HDD 204 on the print job history screen 800 shown in FIG. 8 such that some information items in each print job log are indicated in the list (S1402). Next, the UI control unit 404 accepts an operator's manipulation for selecting a desired print job log from the list (S1403). In response to the selecting manipulation, the UI control unit 404 develops, on the RAM 202, information of all the items (see, FIG. 5) of the selected print job log.

Next, the UI control unit 404 passes the control right to the file creation unit 403. In response to this, the file creation unit 403 extracts information of the remote address 507 and information of the local port 510 from the selected print job log developed on the RAM 202, and creates a filtering condition expression based on the information of the remote address 507 and the information of the local port 510 (S1404).

Then, the file creation unit 403 sets the created filtering condition expression to the filtering unit 402 (S1410).

When determining in S1401 that the transmission history button 705 is touched to select a method for creation from transmission job log, the UI control unit 404 displays a list of the transmission job logs held in the HDD 204 on the transmission job history screen 1100 shown in FIG. 11 such that some information items in each transmission job log are indicated in the list (S1405). Next, the UI control unit 404 accepts an operator's manipulation for selecting a desired transmission job log from the list (S1406). In response to the selecting manipulation, the UI control unit 404 develops on the RAM 202 information of all the items (see, FIG. 6) of the selected transmission job log.

Next, the UI control unit 404 passes the control right to the file creation unit 403. In response to this, the file creation unit 403 extracts information of the remote address 606 and information of the remote port 607 from the selected transmission job log developed on the RAM 202, and creates a filtering condition expression based on the information of the remote address 606 and the information of the remote port 607 (S1407).

Then, the file creation unit 403 sets the created filtering condition expression to the filtering unit 402 (S1410).

When determining in S1401 that the filter setting box 703 is touched to select a manual input method, the UI control unit 404 displays a software keyboard (not shown) on the touch panel 211a, and prompts the operator to input a filtering condition expression via the software keyboard (S1408). When a filtering condition expression is manually input by using the software keyboard or the like (S1409), the UI control unit 404 causes the file creation unit 403 to set the manually input filtering condition expression to the filtering unit 402 (S1410).

As described above, in the first embodiment, the file creation unit 403 automatically creates a filtering condition expression based on address information (IP address and port number) of a job log selected from among displayed job logs, and sets the created expression to the filtering unit 402.

Accordingly, the operator is able to set the filtering condition expression by simply touching the desired print job log in the print job history or the desired transmission job log in the transmission job history displayed on the touch panel 211a, whereby user-friendliness can be improved.

In S1404, the filtering condition expression is created based on information of the remote address and information of the local port. On the other hand, in S1407, the filtering condition expression is created based on information of the remote address and information of the remote port.

This is because in the case of a print job, the communication counterpart designates the MFP and inputs the job, however, in the case of a transmission job, the MFP designates the communication counterpart and inputs the job. Specifically, in the case of a transmission job where the MFP itself inputs the job, only the address of the communication counterpart is used as an element for the creation of filtering condition expression since the own address (IP address and port number) is of course known.

In S1404, the filtering condition expression is created based on the remote address and the local port. This is because in order to acquire desired packets, it is enough to know the remote address (IP address) of the communication counterpart and unnecessary to know the port number of the communication counterpart.

On the other hand, in order to identify a print job, it is necessary for the MFP to know the port number as well as the own address.

Second Embodiment

In the first embodiment, a history of all the print job logs held in the HDD 204 or a history of all the transmission job logs held in the HDD 204 is displayed.

Figure 13:
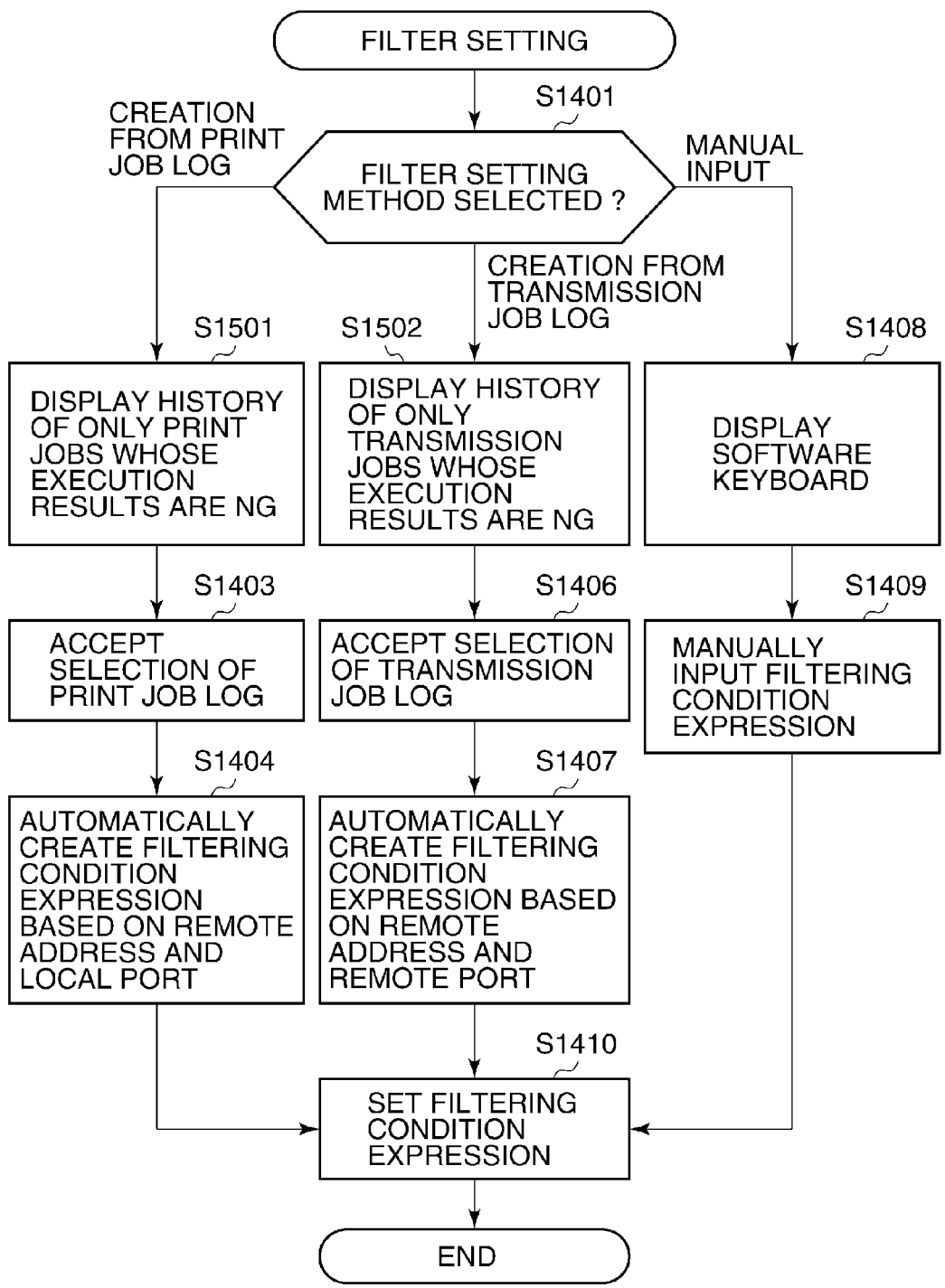
FIG. 13 is a flowchart showing a process for setting a filtering condition expression according to the second embodiment of this invention.

On the other hand, in a second embodiment, a history of logs of only print jobs (including communication processing) whose execution results are NG (failure) or a history of logs of only transmission jobs whose execution results are NG is displayed (see, S1501 and S1502 in FIG. 13).

As a result, it becomes easy to select a job log to be used for investigation of the cause of abnormal completion, whereby a selection mistake can be reduced and hence the user-friendliness can further be improved than in the first embodiment.

Third Embodiment

In the second embodiment, a history of only print job logs or a history of only transmission job logs each indicating that the job execution result is NG is displayed.

In a third embodiment, among the print job logs each indicating that the job execution result is NG, only a history of print job logs indicating that an error other than paper jam or paper out has occurred is displayed. In other words, only a history of print job logs or only a history of transmission job logs each indicating that a communication error has occurred is displayed in the third embodiment.

As a result, it becomes further easy to select a job log to be used for investigation of the cause of abnormal completion, as compared to the second embodiment, whereby a selection mistake can further be reduced and the user-friendliness can further be improved than in the first and second embodiments.

In the print job log 406 shown in FIGS. 5 and 9, the result 506 is indicated as "NG: Paper Jam" when paper jam has occurred and indicated as "NG: No Paper" when paper out has occurred.

This invention is not limited to the first to third embodiments. The technical concept of these embodiments is applicable to various processing apparatuses each configured to perform information processing for a single-function scanner, a single-function printer, or a copying machine having a scanner function and a printer function. The processing apparatuses include a personal computer and other apparatus having a number of functions and provided with a hardware keyboard, etc.

The network to which the processing apparatus is connected may not be a LAN or other narrow-band network, but may be a wide-band network. The network to which the processing apparatus is connected may be a wired network or a wireless network.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-056395, filed Mar. 10, 2009, which is hereby incorporated by reference herein in its entirety.

What is claimed is:

1. A processing apparatus comprising:
a communication unit configured to perform communication via a network;
a packet acquisition unit configured to acquire packets flowing through the network;
a printing unit configured to perform printing based on a print job received by the communication unit;
a holding unit configured to hold printing history information of the printing performed by said printing unit, the printing history information including at least address information of the processing apparatus and address information of an external apparatus as a transmission source of the print job; and
a creation unit configured to create, based on the the address information of the processing apparatus and the address information of the external apparatus in the printing history information held by said holding unit, a selection condition under which packets to be acquired by said packet acquisition unit are selected,
wherein said packet acquisition unit acquires the packets flowing through the network based on the selection condition created by said creation unit.

2. The processing apparatus according to claim 1, wherein the address information of the processing apparatus and the address information of the external apparatus each include a port number.

3. The processing apparatus according to claim 1, further comprising a storage unit configured to store the packets acquired by said packet acquisition.

4. The processing apparatus according to claim 1, further comprising:
a display unit configured to display a printing history screen based on the printing history information held by said holding unit,
wherein a plurality of pieces of the printing history information are displayed on the printing history screen, and
wherein said creation unit creates the selection condition based on the printing history information selected from among the plurality pieces of printing history information by a user.

5. The processing apparatus according to claim 1, wherein the printing history information held by said holding unit further includes a job name.

6. The processing apparatus according to claim 5, wherein the printing history information held by said holding unit further includes a department ID and a user name.

7. A method of controlling a processing apparatus, the method comprising:
a communication step of performing communication via a network;
a packet acquisition step of acquiring packets flowing through the network;
a printing step of performing printing based on a print job received in the communication step;
a holding step of holding printing history information of the printing performed by said printing unit, the printing history information including at least address information of the processing apparatus and address information of an external apparatus as a transmission source of the print job; and
a creation step of creating, based on the address information of the processing apparatus and the address information of the external apparatus in the printing history information held in said holding step, a selection condition under which packets to be acquired in said packet acquisition step are selected,
wherein said packet acquisition step acquires the packets flowing through the network based on the selection condition created in said creation step.

8. A non-transitory computer-readable storage medium storing a program executable by a computer to execute a method of controlling a processing apparatus, the method comprising:
a communication step of performing communication via a network;
a packet acquisition step of acquiring packets flowing through the network;
a printing step of performing printing based on a print job received in the communication step;
a holding step of holding printing history information of the printing performed by said printing unit, the printing history information including at least address information of the processing apparatus and address information of an external apparatus as a transmission source of the print job; and
a creation step of creating, based on the address information of the processing apparatus and the address information of the external apparatus in the printing history information held in said holding step, a selection condition under which packets to be acquired in said packet acquisition step are selected,
wherein said packet acquisition step acquires the packets flowing through the network based on the selection condition created in said creation step.

* * * * *